United States Patent [19]
Yu et al.

[11] Patent Number: 6,048,928
[45] Date of Patent: Apr. 11, 2000

[54] OPTICAL ALIGNMENT POLYMER AND OPTICAL ALIGNMENT COMPOSITION HAVING THE SAME

[75] Inventors: Han-sung Yu; Kwan-young Han, both of Suwon; Seong-han Yu, Seoul; Yong-kyu Jang, Suwon; Byung-hoon Chae; Jang-kun Song, both of Seoul, all of Rep. of Korea

[73] Assignee: Samsung Display Devices, Co., Ltd., Kyungki-do, Rep. of Korea

[21] Appl. No.: 09/052,928

[22] Filed: Apr. 1, 1998

[30] Foreign Application Priority Data

Apr. 18, 1997 [KR] Rep. of Korea ............... 97-14447

[51] Int. Cl.$^7$ .................................................. C08F 22/40
[52] U.S. Cl. ........................ 525/35; 526/258; 526/266
[58] Field of Search ............... 522/35, 904, 905, 522/164; 526/262, 258, 266; 430/20; 428/1; 252/299.01, 299.4, 299.5; 525/68, 55, 56, 132, 390, 392, 397

[56] References Cited

U.S. PATENT DOCUMENTS

| | | | |
|---|---|---|---|
| 4,561,726 | 12/1985 | Goodby et al. | 349/123 X |
| 5,538,823 | 7/1996 | Park et al. | 430/20 |
| 5,578,697 | 11/1996 | Kawamonzen et al. | 528/353 |
| 5,612,450 | 3/1997 | Mizushima et al. | 528/353 |
| 5,670,084 | 9/1997 | Harada et al. | 252/299.01 |
| 5,705,096 | 1/1998 | Kano et al. | 252/299.4 |
| 5,824,377 | 10/1998 | Pirwitz et al. | 428/1 |
| 5,925,423 | 7/1999 | Han et al. | 428/1 |
| 5,976,640 | 11/1999 | Yu et al. | 428/1.1 |

FOREIGN PATENT DOCUMENTS 11-2815  6/1999  Japan.

OTHER PUBLICATIONS

Xie et al. Nonlinear optical crosslinked polymers and interpentrating polymer networks containing azobenzothiazole chromophore groups. Polymer vol. 39, No. 12, pp. 2393–2398, 1998.

Kim et al. Synthesis and Characterization of novel polyimide-based NLO materials form poly (hydroxyimide)s containing alicyclic units (II). Polymer, vol. 40, pp. 6157–5167, 1999.

Yoshino et al. Optical properties and electroluminescence charcteristics of polyacetylene derivatives dependent on substituent and layer structure. Synthetic Metals., vol. 91, pp. 283–287, 1997.

Rajesh et al. Morphological investigation of polyvinyl-4-methoxy cinnamate photopolymer thin and ultrathin films under linear photopolymerization. Thin Solid Films., vol. 325, pp. 251–253., 1998.

*Primary Examiner*—James J. Seidleck
*Assistant Examiner*—Sanza L. McClendon
*Attorney, Agent, or Firm*—Leydig, Voit & Mayer, Ltd.

[57] ABSTRACT

An optical alignment polymer and an optical alignment composition having the same are provided. The optical alignment polymer has a compound selected from the group consisting of poly(maleimide), poly(vinyl acetal), poly (phenylene oxide), poly(maleimide styrene) and their derivatives in its main chain, and a photosensitive group at its side chain. The optical alignment polymer can have high level of optical alignment performance and high thermal stability.

20 Claims, No Drawings

OPTICAL ALIGNMENT POLYMER AND OPTICAL ALIGNMENT COMPOSITION HAVING THE SAME

BACKGROUND OF THE INVENTION

1. Field of the Invention

The present invention relates to an optical alignment polymer and an optical alignment composition having the same, and more particularly, to an optical alignment polymer having excellent optical alignment performance and high thermal stability.

2. Description of the Related Art

In general, a liquid crystal display device has upper and lower substrate, transparent electrodes and alignment layers formed on the upper and lower substrates and a liquid crystal layer between the upper and lower alignment layers.

In the LCD having the aforementioned structure, according to an externally applied voltage, the arrangement of liquid crystals is changed due to influence of the electric field. According to the changed arrangement, external light introduced to the LCD is shielded or transmitted. The LCD is driven by such a property. In other words, if a voltage is applied to the transparent electrode layers, an electric field is formed in the liquid crystal layer. Thus, liquid crystals are driven in a predetermined direction. The light introduced into the liquid crystals of the LCD is shielded or transmitted according to the driving of the liquid crystals.

The functional parameters of the LCD as a display device, i.e., light transmittance, response time, view angle or contrast, are determined by the arrangement characteristic of the liquid crystal molecules. Therefore, a technology of controlling the alignment of the liquid crystal molecules uniformly is a very important factor.

The uniform alignment state of the liquid crystals is difficult to accomplish by merely interposing the liquid crystals between the upper and lower substrates. Thus, it is conventional to form the alignment layers for aligning liquid crystals on the transparent electrode layers.

The alignment layer is conventionally formed by a rubbing method in which a thin film made of an organic polymer material such as polyimide or polyamide is formed, cured and then rubbed with a special cloth.

The rubbing method is easy to conduct and the process thereof is simple. However, minute particles or materials such as cellulose may separate from the cloth used in the rubbing treatment to contaminate the alignment layer. Further, depending on the material for forming the, alignment layer, the alignment may not be accomplished smoothly. Moreover, a thin film transistor may be damaged by static electricity generated during the rubbing treatment.

To solve the above-described problems, an optical alignment technology has been developed in which dust, static electricity or other pollutant particles are not generated and cleanliness is maintained during the overall process. According to such a non-destructive alignment method, polarized light is irradiated onto the optical alignment layer to cause anisotropic photopolymerization. As a result, the optical alignment layer has alignment characteristic, thereby uniformly aligning the liquid crystals.

As the polymer for the optical alignment layer, that is, the optical alignment polymer, a polymer having a cinnamate group such as poly(vinylcinnamate) (PVCN) or poly(vinylmethoxycinnamate) (PVMC), or a polymer having a coumarin group is widely used. These polymer compounds have good alignment performance by light, but have poor thermal stability in alignment.

To solve these problems, other kinds of optical alignment polymers formed from introduction of a photosensitive group such as cinnamate group introduced into a heat-resistant polymer, e.g., polyimide, having a high glass transition temperature (Tg) have been suggested. If the alignment layer is formed of such optical alignment polymers, the alignment performance by light and a pretilt angle of a liquid crystal of liquid crystal display device having the alignment layer improve. And, thermal stability is higher than that of conventional optical alignment polymers such as PVCN, but the above stability is not satisfactory. This is because the introduction density of the photosensitive groups is quite restricted due to characteristics of the repeating unit of the optical alignment polymers.

In a polyimide, carbon number per repeating unit is ten or more. Thus, it is difficult to introduce two or more photosensitive groups into the repeating unit of the polyimide due to structure characteristic of repeating unit. Thus, the introduction density of the photosensitive groups in the polyimide is low.

SUMMARY OF THE INVENTION

To solve the above problems, it is a first object of the present invention to provide an optical alignment polymer which can maximize the introduction density of photosensitive groups into a repeating unit.

It is a second object of the present invention to provide an optical alignment composition having the optical alignment polymer.

To accomplish the first object of the present invention, there is provided an optical alignment polymer having in its main chain a compound selected from the group consisting of poly(maleimide), poly(vinyl acetal), poly(phenylene oxide), poly(maleimide styrene) and their derivatives, and having a photosensitive group at its side chain.

The weight-average molecular weight of the polymer is preferably between $2 \times 10^3$ and $1 \times 10^5$.

The second object of the present invention is achieved by an optical alignment composition comprising first polymer having a compound selected from the group consisting of poly(maleimide), poly(vinyl acetal), poly(phenylene oxide), poly(maleimide styrene) and their derivatives at its main chain, and having a photosensitive group at its side chain, and second polymer having a long-chain alkyl group at its side chain, in a weight ratio of 99:1 and 80:20.

The second object of the present invention is also achieved by an optical alignment composition comprising first polymer having a compound selected from the group consisting of poly(maleimide), poly(vinyl acetal), poly(phenylene oxide), poly(maleimide styrene) and their derivatives at its main chain, and having a photosensitive group at its side chain, and third polymer having a liquid crystal group at its side chain, in a weight ratio of between 99:1 and 80:20.

DESCRIPTION OF THE PREFERRED EMBODIMENTS

The optical alignment polymer according to the present invention has a lower carbon number per repeating unit than conventional optical alignment polymers. Thus, the introduction density of the photosensitive groups can be improved.

The optical alignment polymer according to the present invention has a structure in which a compound selected from the group consisting of poly(maleimide) represented by the following formula (1), poly(vinyl acetal) represented by the following formula (2), poly(phenylene oxide) represented by the following formula (3), poly(maleimide styrene) represented by the following formula (4) and their derivatives is provided in its main chain and a photosensitive group is introduced into the side chain of the compound:

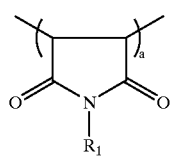
(1)

where $R_1$ is selected from the group consisting of hydrogen; aliphatic hydrocarbon group substituted with hydroxy group; aromatic hydrocarbon group substituted with hydroxy group; aromatic hydrocarbon group having a group selected from the group consisting of unsubstituted or substituted cinnamoyloxy group with at least one substituent (G), unsubstituted or substituted benzo-α-pyronyloxy with at least one substituent (G), and unsubstituted or substituted chalconeoxy with at least one substituent (G); and aliphatic hydrocarbon group having a group selected from the group consisting of unsubstituted or substituted cinnamoyloxy group with at least one substituent (G), unsubstituted or substituted benzo-α-pyronyloxy with at least one substituent (G), and unsubstituted or substituted chalconeoxy with at least one substituent (G);

and a is an integer from 20 to 200.

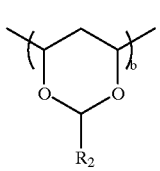
(2)

where $R_2$ is selected from the group consisting of hydrogen; aliphatic hydrocarbon group substituted with hydroxy group; aromatic hydrocarbon group substituted with hydroxy group; aromatic hydrocarbon group having a group selected from the group consisting of unsubstituted or substituted cinnamoyloxy group with at least one substituent (G), unsubstituted or substituted benzo-α-pyronyloxy with at least one substituent (G), and unsubstituted or substituted chalconeoxy with at least one substituent (G); and aliphatic hydrocarbon group having a group selected from the group consisting of unsubstituted or substituted cinnamoyloxy group with at least one substituent (G), and unsubstituted or substituted benzo-α-pyronyloxy with at least one substituent (G); and unsubstituted or substituted chalconeoxy with at least one substituent (G);

and b is an integer from 20 to 200.

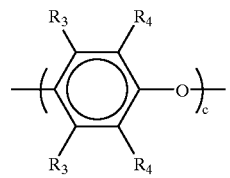
(3)

where $R_3$ and $R_4$ are independently selected form the group consisting of hydrogen; aliphatic hydrocarbon group; aromatic hydrocarbon group; aromatic hydrocarbon group having a group selected from the group consisting of unsubstituted or substituted cinnamoyloxy group with at least one substituent (G), unsubstituted or substituted benzo-α-pyronyloxy with at least one substituent (G), and unsubstituted or substituted chalconeoxy with at least one substituent (G); aliphatic hydrocarbon group having a group selected from the group consisting of unsubstituted or substituted cinnamoyloxy group with at least one substituent (G), unsubstituted or substituted benzo-α-pyronyloxy with at least one substituent (G), and unsubstituted or substituted chalconeoxy with at least one substituent (G);

and c is an integer from 20 to 200.

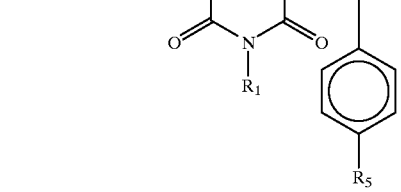
(4)

where $R_1$ and $R_5$ are independently selected form the group consisting of hydrogen; aliphatic hydrocarbon group substituted with hydroxy group; aromatic hydrocarbon group substituted with hydroxy group; aromatic hydrocarbon group having a group selected from the group consisting of unsubstituted or substituted cinnamoyloxy group with at least one substituent (G), unsubstituted or substituted benzo-α-pyronyloxy with at least one substituent (G), and unsubstituted or substituted chalconeoxy with at least one substituent (G); and aliphatic hydrocarbon group having a group selected from the group consisting of unsubstituted or substituted cinnamoyloxy group with at least one substituent (G), unsubstituted or substituted benzo-α-pyronyloxy with at least one substituent (G), and unsubstituted or substituted chalconeoxy with at least one substituent (G);

d is an integer from 20 to 200, and the substituent (G) is selected from the group consisting of alkoxy group, alkyl group, halogen and halide. As an example of the substituent, methoxy group, methyl group, trifluoromethyl or fluoride is used.

The optical alignment composition of the present invention includes the above-described optical alignment polymer and a polymer having a long-chain alkyl at its side chain. Here, if the alignment layer is formed of the polymer having a long-chain alkyl at its side chain, a pretilt angle of a liquid crystal is improved by the interaction between the long-chain alkyl group of its side chain and the liquid crystal layer.

Also, the optical alignment composition of the present invention includes the optical alignment polymer having a photosensitive group such as a cinnamoyl or a benzo-α-pyronyl, and the polymer having a liquid crystal group which can interact with liquid crystals, such as cyanobiphenyl, cyanotriphenyl, cyanophenylcyclohexyl, cyanobiphenylcyclohexyl or a cyanophenyliminophenyl at its side chain, for improving pretilt angle of the liquid crystal. If the optical alignment layer is formed using the optical alignment composition, liquid crystal molecules are arranged by the photo-reaction of the polymer having a group such as a cinnamoyl or a benzo-α-pyronyl group. Also, the pretilt angle of the liquid crystal is improved by the interaction between the group such as cyanophenyl, cyanotriphenyl, cyanophenylcyclohexyl, cyanobiphenylcyclohexyl or cyanophenyliminophenyl and liquid crystals, for example, a Van der Waals force or a polar effect.

The weight-average molecular weight of the polymer having an alkyl or a liquid crystal group in its side chain is preferably between $5 \times 10^3$ and $2 \times 10^5$.

Now, the method for manufacturing an alignment layer using the optical alignment composition according to the present invention and a liquid crystal display device having the same will be described.

First, the optical alignment polymer of the present invention and an appropriate solvent are mixed to produce the optical alignment composition. The solvent is not specifically restricted, but N-methyl pyrrolidone (NMP), dimethylformamide (DMF) or butylcellosolve is preferably used.

The optical alignment composition is coated on two glass sheet substrates, and the resultant is dried to form an alignment layer. Subsequently, linear polarized light having a wavelength of 300~400 nm is irradiated so that a photo-reaction is carried out for 1~60 minutes. Then, the two substrates are sealed using a spacer with a predetermined gap being maintained, thereby completing an empty cell. Thereafter, liquid crystals are injected into the empty cell to complete the liquid crystal display device.

Hereinbelow, the present invention will be described in detail with reference to various embodiments, but the invention is not limited thereto.

EMBODIMENT 1

0.02 mol of poly[N-(p-hydroxy phenyl)maleimide] and 0.02 mole of cinnamoyl chloride were dissolved in 30 ml of dimethyl formamide and reacted at room temperature for 24 hours.

The reaction mixture was re-precipitated three times using water and dried at 100° C. under a vacuum.

The resultant was dissolved in NMP and spin-coated onto a glass substrate and dried at 100° C. for about 1 hour to form an alignment layer.

Then, linear polarized light having a wavelength of 300~400 nm was irradiated onto the alignment layer using a high-pressure mercury lamp having light intensity of about 10 mw/cm², to conduct a photo-reaction for about 5 minutes.

An empty cell was manufactured by sealing two glass substrates where the alignment layer was formed using a spacer. The LCD was completed by injecting liquid crystals into the empty cell.

EXAMPLE 2

This embodiment was carried out in the same manner as described in Example 1, with the exception of 4-fluorocinnamic acid being used, instead of cinnamoyl chloride.

EMBODIMENT 3

0.02 mol of poly[(2-bromomethyl-6-methyl)phenylene oxide], 0.02 mol of 4-fluorocinnamic acid and 0.02 mole of pyridine were dissolved in 30 ml of dimethylformamide and reacted at room temperature for 24 hours.

The reaction mixture was re-precipitated three times using water and dried at 100° C. under a vacuum.

The resultant was dissolved in NMP and spin-coated on a glass substrate and dried at 100° C. for about 1 hour to form an alignment layer.

Then, linear polarized light having a wavelength of 300~400 nm was irradiated into the alignment layer using a high-pressure mercury lamp having light intensity of about 10 mw/cm², to conduct a photo-reaction for about 5 minutes.

An empty cell was manufactured by sealing two glass substrates where the alignment layer was formed using a spacer. The LCD was completed by injecting liquid crystals into the empty cell.

EXAMPLE 4

With the exception of poly[(2,6-dibromomethyl) phenylene oxide being used, instead of poly[(2-bromomethyl-6-methyl)phenylene oxide], an LCD was manufactured in the same manner as described in Example 3.

EXAMPLE 5

With the exception of poly[(2,3,5,6-tetrabromomethyl) phenylene oxide being used, instead of poly[(2-bromomethyl-6-methyl)phenylene oxide], an LCD was manufactured in the same manner as described in Example 3.

EXAMPLE 6

With the exception of poly[N-hydroxy phenyl)maleimide styrene being used, instead of poly[N-(p-hydroxy phenyl) maleimide], an LCD was manufactured in the same manner as described in Example 1.

EMBODIMENT 7

0.02 mol of poly[N-(p-hydroxy phenyl)maleimide], 0.02 mol of cinnamoyl chloride and 0.02 mol of pyridine were dissolved in 30 ml of dimethylformamide and reacted at room temperature for 24 hours.

The reaction mixture was re-precipitated three times using water and dried at 100° C. under a vacuum.

The resultant and a polyimide represented by the following formula (5) were mixed at a molecular weight ratio of 90:10.

(5)

where n is an integer from 20 to 200.

The mixture was dissolved in NMP and subsequent processes were the same as described in Embodiment 1.

EXAMPLE 8

With the exception of polystyrene having a cyanobiphenyl in its side chain being used, instead of the polyimide represented by the following formula (5), an LCD was manufactured in the same manner as described in Example 7.

With respect to the LCD manufactured according to Embodiments 1 through 8, the pretilt angle of the liquid crystal and thermal stability of the alignment layer were measured. The pretilt angle was measured using a crystal rotation method. The thermal stability was measured by raising the temperature up to 180° C., maintaining the resultant for a predetermined time at that temperature, lowering the temperature to room temperature, and then checking the deformation degree of the alignment layer through a polarizing film.

In the alignment state of the alignment layers of the LCDs manufactured according to Embodiments 1 through 8, the alignment layer had a thermal stability high enough not to deform the alignment layer even if the temperature was raised to 180° C. Also, the pretilt angle of the liquid crystal was increased up to 15°. Particularly, as in Embodiments 2 and 3, when the polymers having fluoride were used, the pretilt angle of the liquid crystal was greatly improved.

In a liquid crystal display device having the alignment layer formed using an optical alignment polymer and the optical alignment composition according to the present invention, the alignment of liquid crystal molecules becomes thermally stable at 180° C., and the pretilt angle of the liquid crystal can be increased to 15°.

What is claimed is:

1. An optical alignment polymer having in its main chain a compound selected from the group consisting of poly(maleimide), poly(vinyl acetal), poly(phenylene oxide), poly(maleimide styrene) and their derivatives, and the polymer having a photosensitive group at a side chain.

2. The optical alignment polymer as claimed in claim 1, wherein a weight-average molecular weight of the polymer is between $2 \times 10^3$ and $1 \times 10^5$.

3. The optical alignment polymer as claimed in claim 1, wherein the poly(maleimide) and its derivatives are represented by the following formula (1):

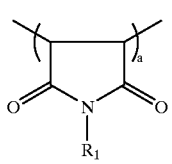

(1)

where $R_1$ is selected from the group consisting of hydrogen; aliphatic hydrocarbon group substituted with a hydroxy group; aromatic hydrocarbon group substituted with a hydroxy group; aromatic hydrocarbon group having a group selected from the group consisting of unsubstituted or substituted cinnamoyloxy group with at least one substituent (G), unsubstituted or substituted benzo-α-pyronyloxy with a least one substituent (G), and an unsubstituted or substituted chalconeoxy with at least one substituent (G); and an aliphatic hydrocarbon group having a group selected from the group consisting of unsubstituted or substituted cinnamoyloxy group with at least one substituent (G), unsubstituted or substituted benzo-α-pyronyloxy with at least one substituent (G), and unsubstituted or substituted chalconeoxy with at least one substituent (G);

the substituent (G) is selected from the group consisting of alkoxy group, alkyl group, halogen and halide;
and a is an integer from 20 to 200.

4. The optical alignment polymer as claimed in claim 1, wherein the poly(vinyl acetal) and its derivatives are represented by the following formula (2):

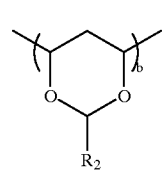

(2)

where $R_2$ is selected from the group consisting of hydrogen; aliphatic hydrocarbon group substituted with a hydroxy group; aromatic hydrocarbon group substituted with hydroxy group; aromatic hydrocarbon group having a group selected from the group consisting of unsubstituted or substituted cinnamoyloxy group with at least one substituent (G), unsubstituted or substituted benzo-α-pyronyloxy with at least one substituent (G), and unsubstituted or substituted chalconeoxy with at least one substituent (G); and aliphatic hydrocarbon group having a group selected from the group consisting of unsubstituted or substituted cinnamoyloxy group with at least one substituent (G), unsubtituted or substituted benzo-α-pyronyloxy with at least one substituent (G), and unsubstituted or substituted chalconeoxy with at least one substituent (G);

the substituent (G) is selected from the group consisting of alkoxy group, alkyl group, halogen and halide;
and b is an integer from 20 to 200.

5. The optical alignment polymer as claimed in claim 1, wherein the poly(phenylene oxide) and its derivatives are represented by the following formula (3):

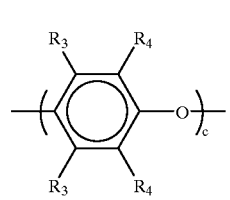

(3)

where $R_3$ and $R_4$ are independently selected form the group consisting of hydrogen; aliphatic hydrocarbon group; aromatic hydrocarbon group; aromatic hydrocarbon group having a group selected from the group consisting of unsubstituted or substituted cinnamoyloxy group with at least one substituent (G), unsubstituted or substituted benzo-α-pyronyloxy with at least one substituent (G), and unsubstituted or substituted chalconeoxy with at least one substituent (G); and aliphatic hydrocarbon group having a group selected from the group consisting of unsubstituted or substituted cinnamoyloxy group with at least one substituent (G), unsubstituted or substituted benzo-α-pyronyloxy with at least one substituent (G), and unsubstituted or substituted chalconeoxy with at least one substituent (G);

is the substituent (G) is selected from the group consisting of alkoxy group, alkyl group, halogen and halide;
and c is an integer from 20 to 200.

6. The optical alignment polymer as claimed in claim 1, wherein the poly(maleimidestyrene) and its derivatives are represented by the following formula (4):

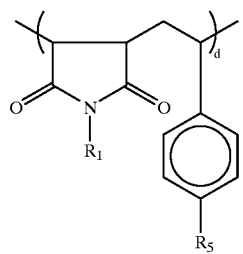

(4)

where $R_1$ and $R_5$ are independently selected from the group consisting of hydrogen; aliphatic hydrocarbon group substituted with hydroxy group; aromatic hydrocarbon group substituted with hydroxy group; aromatic hydrocarbon group having a group selected from the group consisting of unsubstituted or substituted cinnamoyloxy group with at least one substituent (G), unsubstituted or substituted benzo-α-pyronyloxy with at least one substituent (G), and unsubstituted or substituted chalconeoxy with at least one substituent (G); aliphatic hydrocarbon group having a group selected from the group consisting of unsubstituted or substituted cinnamoyloxy group with at least one substituent (G), unsubstituted or substituted benzo-α-pyronyloxy with at least one substituent (G), and unsubstituted or substituted chalconeoxy with at least one substituent (G);

the substituent (G) is selected from the group consisting of alkoxy group, alkyl group, halogen and halide;

and d is an integer from 20 to 200.

7. An optical alignment composition comprising a first polymer having a compound selected from the group consisting of poly(maleimide), poly(vinyl acetal), poly (phenylene oxide), poly(maleimide styrene) and their derivatives at a main chain, and having a photosensitive group at a side chain; and a second polymer having a long-chain alkyl group at a side chain, in a weight ratio of between 99:1 and 80:20.

8. The optical alignment composition as claimed in claim 7, wherein the weight-average molecular weight of the first polymer is between $2 \times 10^3$ and $1 \times 10^5$.

9. The optical alignment composition as claimed in claim 7, wherein the weight-average molecular weight of the second polymer is between $5 \times 10^3$ and $2 \times 10^5$.

10. The optical alignment polymer as claimed in claim 7, wherein the poly(maleimide) and its derivatives are represented by the following formula (1):

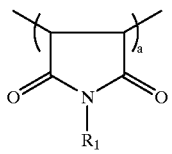

(1)

where $R_1$ is selected from the group consisting of hydrogen; aliphatic hydrocarbon group substituted with hydroxy group; aromatic hydrocarbon group substituted with a hydroxy group; aromatic hydrocarbon group having a group selected from the group consisting of unsubstituted or substituted cinnamoyloxy group with at least one substituent (G), unsubstituted or substituted benzo-α-pyronyloxy with at least one substituent (G), and unsubstituted or substituted chalconeoxy with at least one substituent (G); and aliphatic hydrocarbon group having a group selected from the group consisting of unsubstituted or substituted cinnamoyloxy group with at least one substituent (G), unsubstituted or substituted benzo-α-pyronyloxy with at least one substituent (G), and unsubstituted or substituted chalconeoxy with at least one substituent (G);

the substituent (G) is selected from the group consisting of alkoxy group, alkyl group, halogen and halide;

and a is an integer from 20 to 200.

11. The optical alignment polymer as claimed in claim 7, wherein the poly(vinyl acetal) and its derivative are represented by the following formula (2):

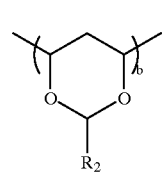

(2)

where $R_2$ is selected from the group consisting of hydrogen; aliphatic hydrocarbon group substituted with hydroxy group; aromatic hydrocarbon group substituted with hydroxy group; aromatic hydrocarbon group having a group selected from the group consisting of unsubstituted or substituted cinnamoyloxy group with at least one substituent (G), unsubstituted or substituted benzo-α-pyronyloxy with at least one substituent (G), and unsubstituted or substituted chalconeoxy with at least one substituent (G); and aliphatic hydrocarbon group having a group selected from the group consisting of unsubstituted or substituted cinnamoyloxy group with at least one substituent (G), unsubstituted or substituted benzo-α-pyronyloxy with at least one substituent (G), and unsubstituted or substituted chalconeoxy with at least one substituent (G);

the substituent (G) is selected from the group consisting of alkoxy group, alkyl group, halogen and halide;

and b is an integer from 20 to 200.

12. The optical alignment polymer as claimed in claim 7, wherein the poly(phenylene oxide) and its derivatives are represented by the following formula (3):

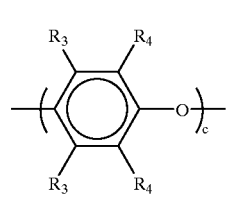

(3)

where $R_3$ and $R_4$ are independently selected form the group consisting of hydrogen; aliphatic hydrocarbon group; aromatic hydrocarbon group; aromatic hydrocarbon group having a group selected from the group consisting of unsubstituted or substituted cinnamoyloxy group with at least one substituent (G), unsubstituted or substituted benzo-α-pyronyloxy with at least one substituent (G), and unsubstituted or substituted chalconeoxy with at least one substituent (G); and aliphatic hydrocarbon group having a group selected from the group consisting of unsubstituted or substituted cinnamoyloxy group with at least one substituent (G), unsubstituted or substituted benzo-α-pyronyloxy with at least one substituent (G), and unsubstituted or substituted chalconeoxy with at least one substituent (G);

the substituent (G) is selected from the group consisting of alkoxy group, alkyl group, halogen and halide;

and c is an integer from 20 to 200.

13. The optical alignment polymer as claimed in claim 7, wherein the poly(maleimidestyrene) and its derivatives are represented by the following formula (4):

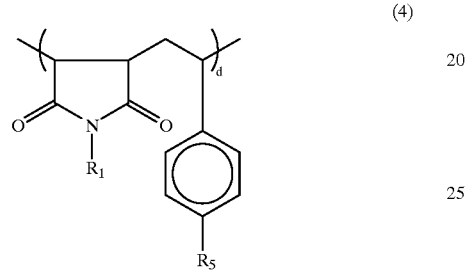

(4)

where $R_1$ and $R_5$ are independently selected from the group consisting of hydrogen; aliphatic hydrocarbon group substituted with a hydroxy group; aromatic hydrocarbon group substituted with a hydroxy group; aromatic hydrocarbon group having a group selected from the group consisting of unsubstituted or substituted cinnamoyloxy group with at least one substituent (G), unsubstituted or substituted benzo-α-pyronyloxy with at least one substituent (G), and unsubstituted or substituted chalconeoxy with at least one substituent (G), and aliphatic hydrocarbon group having a group selected from the group consisting of unsubstituted or substituted cinnamoyloxy group with at least one substituent (G), unsubstituted or substituted benzo-α-pyronyloxy with at least one substituent (G), and unsubstituted or substituted chalconeoxy with at least one substituent (G);

the substituent (G) is selected from the group consisting of alkoxy group, alkyl group, halogen and halide;

and d is an integer from 20 to 200.

14. An optical alignment composition comprising first polymer having a compound selected from the group consisting of poly(maleimide), poly(vinyl acetal), poly(phenylene oxide), poly(maleimide styrene) and their derivatives at a main chain, and having a photosensitive group at a side chain, and a third polymer having a liquid crystal group at a side chain, in a weight ratio of between 99:1 and 80:20.

15. The optical alignment composition as claimed in claim 14, wherein the weight-average molecular weight of the first polymer is between $2 \times 10^3$ and $1 \times 10^5$.

16. The optical alignment composition as claimed in claim 14, wherein the weight-average molecular weight of the third polymer is between $5 \times 10^3$ and $2 \times 10^5$.

17. The optical alignment polymer as claimed in claim 14, wherein the poly(maleimide) and its derivatives are represented by the following formula (1):

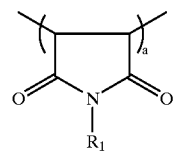

(1)

where $R_1$ is selected from the group consisting of hydrogen, a hydroxy alkyl, a hydroxy phenyl, an aromatic group having a group selected from the group consisting of a cinnamoyloxy, a cinnamoyloxy having at least one substituent (G), a benzo-α-pyronyloxy, a benzo-α-pyronyloxy having at least one substituent (G), a chalconeoxy and a chalconeoxy having at least one substituent (G), and an alkyl having a group selected from the group consisting of a cinnamoyloxy, a cinnamoyloxy having at least one substituent (G), a benzo-α-pyronyloxy, a benzo-α-pyronyloxy having at least one substituent (G), a chalconeoxy and a chalconeoxy having at least one substituent (G), the substituent (G) is selected from the group consisting of an alkoxy, an alkyl, a trifluroalkyl and a halogen, e.g., a methoxy, a methyl, a trifluoromethyl or a fluorine, and a is a number between 20 and 200, inclusive.

18. The optical alignment polymer as claimed in claim 14, wherein the poly(vinyl acetal) and its derivatives are represented by the following formula (2):

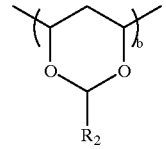

(2)

where $R_2$ is selected from the group consisting of hydrogen; aliphatic hydrocarbon group substituted with a hydroxy group; aromatic hydrocarbon group substituted with a hydroxy group; aromatic hydrocarbon group having a group selected from the group consisting of unsubstituted or substituted cinnamoyloxy group with at least one substituent (G), unsubstituted or substituted benzo-α-pyronyloxy with at least one substituent (G), and unsubstituted or substituted chalconeoxy with at least one substituent (G); aliphatic hydrocarbon group having a group selected from the group consisting of unsubstituted or substituted cinnamoyloxy group with at least one substituent (G), unsubstituted or substituted benzo-α-pyronyloxy with at least one substituent (G), and unsubstituted or substituted chalconeoxy with at least one substituent (G);

the substituent (G) is selected from the group consisting of alkoxy group, alkyl group, halogen and halide;

and b is an integer from 20 to 200.

19. The optical alignment polymer as claimed in claim 14, wherein the poly(phenylene oxide) and its derivatives are represented by the following formula (3):

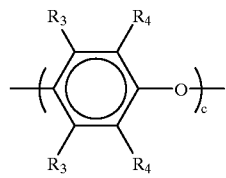

(3)

where $R_3$ and $R_4$ are independently selected form the group consisting of hydrogen; aliphatic hydrocarbon group; aromatic hydrocarbon group; aromatic hydrocarbon group having a group selected from the group consisting of unsubstituted or substituted cinnamoyloxy group with at least one substituent (G), unsubstituted or substituted benzo-α-pyronyloxy with at least one substituent (G), and unsubstituted or substituted chalconeoxy with at least one substituent (G); aliphatic hydrocarbon group having a group selected from the group consisting of unsubstituted or substituted cinnamoyloxy group with at least one substituent (G), unsubstituted or substituted benzo-α-pyronyloxy with at least one substituent (G), and unsubstituted or substituted chalconeoxy with at least one substituent (G);

the substituent (G) is selected from the group consisting of alkoxy group, alkyl group, halogen and halide;

and c is an integer from 20 to 200.

20. The optical alignment polymer as claimed in claim 14, wherein the poly(maleimidestyrene) and its derivatives are represented by the following formula (4):

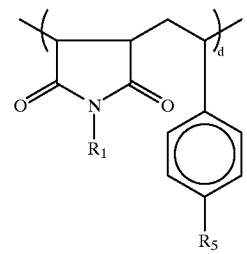

(4)

where $R_1$ and $R_5$ are independently selected from the group consisting of hydrogen; aliphatic hydrocarbon group substituted with a hydroxy group; aromatic hydrocarbon group substituted with a hydroxy group; aromatic hydrocarbon group having a group selected from the group consisting of unsubstituted or substituted cinnamoyloxy group with at least one substituent (G), unsubstituted or substituted benzo-α-pyronyloxy with at least one substituent (G), and unsubstituted or substituted chalconeoxy with at least one substituent (G); and aliphatic hydrocarbon group having a group selected from the group consisting of unsubstituted or substituted cinnamoyloxy group with at least one substituent (G), unsubstituted or substituted benzo-α-pyronyloxy with at least one substituent (G), and unsubstituted or substituted chalconeoxy with at least one substituent (G);

the substituent (G) is selected from the group consisting of alkoxy group, alkyl group, halogen and halide;

and d is an integer from 20 to 200.

* * * * *